May 5, 1942.　　　　B. C. SKINNER　　　　2,281,625
METHOD OF COLORING FRUITS AND VEGETABLES
Filed Sept. 24, 1941　　　2 Sheets-Sheet 1

INVENTOR
BRONSON C. SKINNER
BY D. Malcolm
ATTORNEY

May 5, 1942. B. C. SKINNER 2,281,625
METHOD OF COLORING FRUITS AND VEGETABLES
Filed Sept. 24, 1941 2 Sheets-Sheet 2

INVENTOR
BRONSON C. SKINNER
BY
D. Malcolm
ATTORNEY

Patented May 5, 1942

2,281,625

UNITED STATES PATENT OFFICE 2,281,625

METHOD OF COLORING FRUITS AND VEGETABLES

Bronson C. Skinner, Dunedin, Fla.

Application September 24, 1941, Serial No. 412,079

13 Claims. (Cl. 99—103)

This invention relates to coloring fruits and vegetables and is a continuation in part of my application Serial No. 255,930, filed February 11, 1939.

The object of the invention is to provide a new and improved method and means for imparting a desirable natural color to fruits and vegetables for the purpose of enhancing their appearance and salability.

It is a common practice to subject citrus fruits such as oranges, grapefruit, etc., to a curing process for the purpose of improving their color preparatory to shipping the fruit to market, and the same practice is followed with bananas, tomatoes, and various other fruits and vegetables. It is well known that many fruits and vegetables, particularly citrus fruits, are bought almost entirely "by the eye" and therefore growers are never able to obtain as high a price for off-color fruit as for fruit in which the color is attractively and brilliantly developed.

For many years the usual method of coloring citrus fruits in Florida and elsewhere has been to stack the fruit in closed rooms built in packing houses or in the fruit groves and to maintain the rooms at elevated temperatures of around 80–90° F. for a protracted period of time, usually from one to three days. The trade has been taught that it is necessary to admit ethylene gas to these coloring rooms to promote the coloring, and either to feed fresh air into the rooms continuously or else to open the rooms at frequent intervals, usually every four to six hours, to ventilate them, or to both feed fresh air continuously and also open the rooms frequently. The theory behind this procedure has always been that the fruit are smothered by being kept in a closed room for any protracted time, and many authorities have also believed that the presence of carbon dioxide causes damage to the fruit.

I have now discovered that this standard method of coloring fruits and vegetables, and in particular the theory and practice of continuously aerating or frequently ventilating coloring rooms, is incorrect and is not only expensive and inefficient in that it consumes too much time and labor and is wasteful of valuable gases which are given off by the fruit and which are helpful in the coloring operation, but that this method has also been responsible for a large percentage of decayed fruit which has heretofore been ascribed to the fact that the fruit were smothered. I have discovered that these defects can be largely remedied and a much superior coloring obtained by curing the fruit in a room which is substantially air-tight, and which is not ventilated at all and into which no fresh air need be admitted.

In my investigations leading up to the development of the present invention I discovered that it is not the so-called smothering action which causes the decay of fruit treated according to previous practice but that the decay is principally caused by the fact that the fruit give off moisture during the curing process and the humidity in the coloring room very rapidly reaches the saturation point or approximates 100% humidity. Hence whatever advantage may have been obtained in the past by admitting fresh air or by ventilating the room at frequent intervals was not due to the dilution or removal of the foul air but was due to the fact that the fresh air tended to reduce the humidity to a point which to some extent retarded decay, and to a cooling of the fruit which also tended to reduce the humidity by reducing the tendency of the fruit to give off moisture.

I have found that decay in the case of citrus fruit is greatly reduced when the humidity of the coloring room is kept below 85%, and that in some cases a lower humidity such as 75% or lower is a safer point at which to operate. Humidities lower than 75% tend to cause undue shrinkage of the fruit; in fact there is an appreciable shrinkage at 75% humidity and for this reason 80% humidity is preferable if the packing house prefers to keep down wilt and sacrifice a little in the way of decay. In other words, the operator of a packing house has to choose between a relative humidity of 80% with a given loss due to decay but a relatively small loss in wilt or shrinkage due to the drying out of the fruit, or to use a humidity of around 75% or lower which will result in better decay control but a slightly greater loss due to shrinkage. If desired, the packing house operator can go still further and use a humidity of 70% or lower with a still smaller loss from decay and a greater loss due to wilt or drying out of the fruit. This applies particularly to the treatment of citrus fruits but substantially the same results are obtained in the treatment of bananas, tomatoes and various other fruits and vegetables. In any case, I have discovered that the coloring action on the fruit is caused not only by the ethylene which is admitted to the room during the coloring process, but also by the gases which are given off by the fruits themselves, and that it is therefore a mistake to feed fresh air into the room and drive out these gases which are helpful in coloring. As a matter of fact, the fruit can be colored without the use of any gases except those given off by the fruit if my method is used and the rooms preferably not ventilated in any manner.

My invention, in one embodiment hereinafter described, comprises placing the fruits or vegetables to be colored in a room which is substantially air-tight and into which little, if any, air is admitted, and keeping the room closed and at a substantially constant relative humidity during the entire coloring period. Various methods may be employed to regulate the humidity in the closed coloring room. In coloring rooms operated according to my invention I preferably employ the usual air circulation causing the air to be drawn up from the bottom of the room, heated and spread out over the top of the fruit, and a feature of my invention resides in removing moisture given off by the fruit from the room, either by condensing the moisture on cooling coils or by passing the air through a suitable absorptive material such as calcium chloride, activated alumina, silica-gel or the like, so as to reduce the humidity of the room to the desired point, usually around 85 to 70% relative humidity as stated above.

Under one method of operating a coloring room according to my method, the room is first filled with the fruit or vegetables packed in the usual field boxes which are stacked one on the other, after which the doors are closed and live steam is preferably introduced into the room for a period of from three to six hours in order to raise the temperature of the fruit to at least the wet bulb temperature at which the room is to be operated. At the end of the stated period when the fruit have reached the temperature of the room, the live steam is cut off and heat supplied to the room by means of radiators or dry-heat coils, and the dry bulb temperature raised to the desired operating level. At this point the fruit will begin to give off moisture, and the wet bulb temperature will rapidly rise to a point close to the dry bulb temperature. At such time, or sooner, the operator starts the mechanism for removing the excess moisture from the room.

Under another method of operating a coloring room which I consider to be a better method, the room is first filled with fruit or vegetables, packed in the usual field boxes which are stacked one on the other, after which the doors are closed and both live steam and dry heat are admitted to the room simultaneously in proportionate amounts sufficient to maintain a relative humidity of approximately 75%, until the room reaches a dry bulb temperature of 80 degrees. Then no more live steam is admitted, and dry heat is admitted only in sufficient amounts to maintain a relative humidity at the desired point—probably 75% relative humidity.

In case the dry bulb temperature should drop below 80 degrees, then live steam is admitted sufficiently so that the dry bulb temperature is raised to 80 degrees while maintaining the proper relative humidity.

Under these conditions the fruit will gradually rise in temperature and the room itself will gradually rise in temperature, while maintaining this constant humidity by admitting dry heat to the room. Under this condition, the admission of dry heat to the room is controlled by a humidostat or suitable humidity control device. The admission of live steam to the room is controlled by a thermostat, which admits live steam only as long as the temperature of the room is below 80 degrees, and the humidostat admits dry heat to the room whenever the relative humidity of the room rises above 75%.

A still better method of operating the room is to first fill the room with fruit or vegetables packed in the usual field boxes, stacked one on the other, after which the doors are closed; both live steam and dry heat are admitted to the room simultaneously in proportionate amounts sufficient to maintain a relative humidity of approximately seventy-five or eighty percent. When the room reaches a temperature which will give good coloring, which I estimate to be a dry bulb temperature of 80 to 85 degrees, with a humidity of 75 to 80 percent, the spread between the wet and dry bulb temperatures will be about 5 degrees. Therefore, the admission of live steam is controlled as by a thermostatically controlled valve operated by a wet bulb, so that the live steam is admitted in only sufficient quantities to maintain a wet bulb temperature of 80 degrees, and dry heat is admitted to maintain a relative humidity of 75 to 80 percent, which means a spread of about five degrees between the wet and dry bulb temperature. When the wet bulb temperature exceeds a given point—for example, 80 degrees, the live steam is cut off entirely and only sufficient dry heat is admitted by a valve controlled by a humidostat to maintain the desired relative humidity. This continuous admission of dry heat will of course gradually raise the temperature of the room and the moisture given off by the fruit or vegetables in the room will gradually raise the wet bulb temperature as well as the dry bulb temperature to a maximum for safe operation, at which point a dry bulb temperature control set at 90 degrees will cause the moisture in the room to be removed, either by condensation of the moisture through cooling coils, or by absorption with materials as described above, or by another method to be hereinafter described.

Under the foregoing conditions in a room, when the room reaches a temperature of 80 degrees, it will stay at this temperature for a period of time until the fruit reach such a temperature that they give off moisture themselves, without the admission of any live steam, and cause the relative humidity to rise, in which case the humidity control will admit dry heat to the radiators which will raise the dry bulb temperature. This process will go on until the temperature reaches a maxmum, for example, 90 degrees, which point is as high as I desire to go in coloring fruit. When this point is reached, if the relative humidity rises above the selected relative humidity of 75%, the dry bulb temperature will automatically be raised above 90 degrees by the humidity control, and this raising of the dry bulb temperature above 90 degrees will cause cooling water, or other cooling means, to enter the cooling coil and condense moisture out of the room until the dry bulb temperature is dropped again to the low point of 90 degrees.

As stated above, the humidity control regulates the supply of heat to the radiators, and the thermostatic control controls the admission of live steam to the room until the dry bulb temperature reaches a point of 80 degrees; then this dry steam is shut off. When the temperature rises and the dry bulb temperature reaches 90 degrees, the thermostatic control admits water or other cooling means to the cooling coils, removing moisture from the room in order that the dry heat radiators may maintain proper relative humidity without raising the temperature of the room above 90 degrees.

I have found from experience that a coloring room full of fruit, for example, a room 30 x 16 x 10 ft. high, including the space below the usual false floor, will hold about 500 boxes of fruit weighing 50,000 pounds, and will give off moisture at the rate of approximately ten to twenty pounds per hour. This moisture may be removed by cooling coils on which the moisture will condense and can be drained away, or, when calcium chloride or other absorptive materials are employed to remove the moisture from the air, sufficient air should be withdrawn from the room and circulated through the absorptive medium to permit it to absorb the ten or twenty pounds of moisture per hour. Ethylene or other suitable gases may be admitted to the room to assist in the coloring operation, or if desired the coloring may depend entirely upon the gases given off by the fruit themselves.

It will be appreciated that the cost of equipping a coloring room of the above type with a cooling coil for applying the necessary cooling water or other cooling means to condense the moisture out of the air, will be appreciable, in some cases more than a small packing house may want to pay. Therefore a modified method is sometimes desirable to reduce this cost, and, at the same time, get part of the benefits of the above described methods of operation. These benefits are of course, first, a better method of coloring, and second, a lower steam consumption.

In all previous coloring rooms where fresh air is admitted continuously, enough steam must be supplied to heat the air that is continuously brought in. If the amount of air could be cut down or reduced, the cost of steam would be materially reduced. I have therefore developed the following modified method of operation, which gives some of the foregoing benefits of my preferred method and yet is low in cost: according to my modified method the coloring room is constructed exactly as previously described, and filled with fruit; the room is equipped with a thermostatically controlled supply of live steam which is discharged directly into the room to add humidity and raise the wet bulb temperature. The thermostatically controlled valve is operated by a wet bulb; that is to say, a bulb which operates a valve, which bulb is covered by a piece of cloth which is kept continuously moist, so that the operation of the valve will be based upon the wet bulb temperature of the room.

The dry heat is supplied to the radiator in the room to decrease the humidity by adding sensible heat to the air. The valve controlling the supply of steam to the radiator is operated and controlled by a humidostat which maintains the desired humidity of say 80%. As in my previously described method, these two supplies of heat raise the temperature of the room to the minimum operating temperature of 85 degrees dry bulb and 80 degrees wet bulb. From that point on, only live steam is admitted to the room, which is substantially air tight, no fresh air being added. The admission of this dry heat will gradually raise the temperature of the room.

Now, when I reach the point of maximum temperature for the safe operation of the room, which I consider to be 85 degrees wet bulb and 90 degrees dry bulb, instead of removing the moisture by use of a cooling coil or other means for condensing the moisture out of the air, I admit fresh air to the room, which fresh air contains less moisture per cubic foot or per pound than air in the room. To accomplish this result I either provide a blower which blows the fresh air directly into the room, or else suitable dampers or doors which automatically open. Either method is controlled by a thermostat which admits air into the room when the temperature of the room exceeds 90 degrees. The admission of this air, of course, forces out of the room air containing a high amount of moisture, and of course the drier the air that I blow into the room the less amount of air will be required. On some days the humidity of the outside air is relatively low and only a small amount of air will be required to drop the temperature of the room, at which point the thermostatic control operates to shut off the fresh air. In other words, by this method only just enough fresh air is admitted to keep the temperature of the room from rising above 90 degrees.

With this method of operation it is also possible to arrange an auxiliary gas valve, so that at the times when fresh air is being admitted to the room an additional or extra supply of ethylene gas can be admitted to the room also. It will be evident that this method of operation is superior to the prior art method of operating in which air is admitted to coloring rooms continuously at all times, whether it is needed or not; such prior art method is wasteful not only in steam applied to the room, but is also wasteful of ethylene gas which is supplied to the room to color the fruit, because the ethylene gas is continually being blown out while the fresh air is being admitted.

The various features and advantages of the invention will be described in connection with the accompanying drawings, in which.

Figure 1:
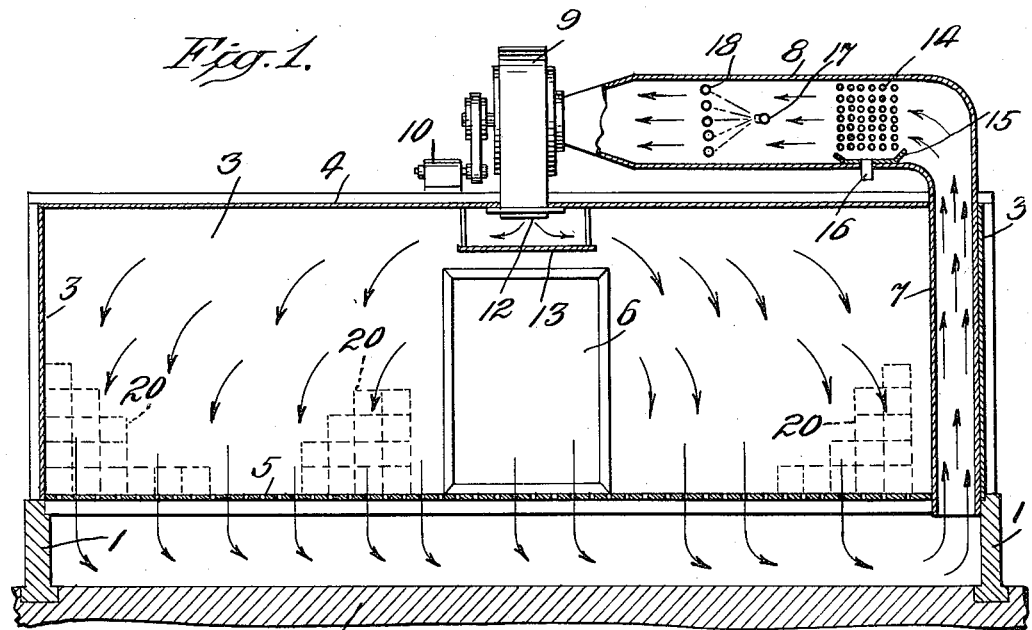
Fig. 1 is a vertical sectional view of a coloring room embodying the invention.

The coloring room shown in Fig. 1 is built upon solid walls 1 resting upon the ground or upon a suitable foundation 2, and is provided with the usual four walls 3, roof 4 and a slotted false floor 5 which is mounted a suitable distance above the foundation 2.

In the embodiment illustrated, the openings in the floor 5 are in the form of narrow slots between the floor planks, the planks being laid diagonally so that no slots can ever be entirely obstructed by the fruit boxes and also for the purpose of facilitating trucking across the slots. One of the walls of the room is provided with a door 6 for the admission of boxes of fruit which are usually carted in on trucks, it being understood that a similar door may be provided in the opposite wall or elsewhere if desired. The usual practice is to cart the boxes of fruit in from the fields through one door and cart them out through another door at the opposite end of the room leading into the packing plant at the conclusion of the coloring operation.

In the embodiment shown in Fig. 1 a pipe or conduit 7 extends upwardly through the floor 5 and through the roof 4 of the room where it leads into a horizontal extension or passage 8 which is connected to the inlet side of a fan or blower 9 driven by a motor 10. The outlet 12 of blower 9 opens into the center of the room directly above a horizontal baffle plate 13 which deflects the incoming stream of gases downwardly to all parts of the room. In this way the fan causes a continuous recirculation of air and coloring gases which pass downwardly throughout all parts of the room and in contact with the surfaces of the entire charge of fruit, and thence downwardly through the slotted floor 5 to the bottom of the conduit 7 into passage 8, as indicated by the arrows in Fig. 1.

The passage 8 is provided with suitable cooling coils 14 beneath which is a drip pan 15 and a drain pipe 16 leading outside the passage 8 for conducting condensed moisture out of the circulating stream of gases. The passage 8 also contains a steam jet 17, which may also be used for admitting ethylene gas or the like into the circulating system, and with a suitable dry heater or radiator 18 which in the form shown is mounted adjacent the inlet side of the fan 9.

In the operation of the coloring room shown in Fig. 1, the room is first filled with fruit or vegetables stacked in the usual field boxes 20, after which the doors of the room are closed. The blower 9 is set in operation and live steam is introduced into the room through jet 17 for a period of time sufficient to raise the temperature of the fruit or vegetables at least to the wet bulb temperature at which the room is to operate, three to six hours usually being sufficient for this purpose according to the size of the room. For example, if the room is to be operated at a temperature of 85° F., with 80% humidity, the wet bulb temperature would be 80° F., so steam would be introduced into the room for a period of three to six hours and the room maintained with the live steam at a temperature of 80° F. At the end of this period when the fruit or vegetables have reached the temperature of the room, the steam is cut off and the radiator or heating coils 18 turned on and the dry bulb temperature of the room raised to 85° F., the blower 9 maintaining the circulation of the heated stream as indicated by the arrows in Fig. 1.

At this point the fruit or vegetables will begin to give off moisture, and the wet bulb temperature of the room will tend to rise rapidly to a point close to the dry bulb temperature. But before this the operator will start the drying mechanism, in this case the cooling coils 14, causing the excess moisture to be condensed on the coils 14 and drip into the pan 15 from which it is continuously removed from the circulating system through pipe 16. As previously explained, ethylene or any other suitable gas may be admitted to the room through a suitable pipe to assist in the coloring operation, or the coloring may be influenced entirely by the gases given off by the fruits or vegetables themselves. The room is kept substantially closed during the entire coloring operation, except for intermittent periods of inspection to see how the coloring is progressing, and the humidity is maintained at the desired point throughout the coloring operation by removing the proper amount of moisture and simultaneous applications of dry heat as described above.

Figure 2:
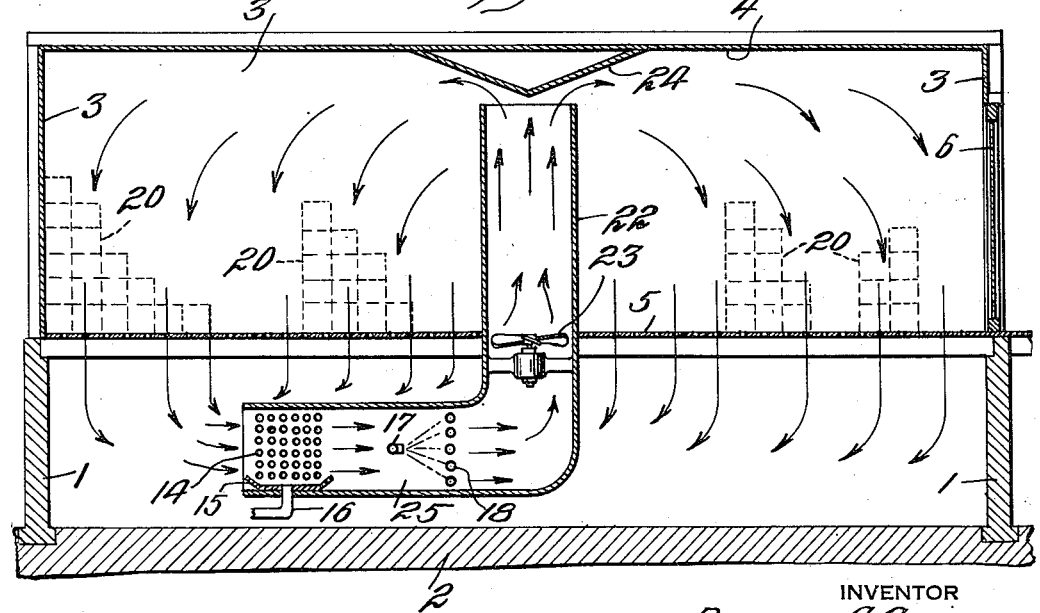
Fig. 2 is a similar view illustrating a modification of the invention.

In the modified coloring room shown in Fig. 2 a cylindrical stack 22 extends upwardly through the floor 5 at the center of the room to a point adjacent the roof 4, and a fan 23 is mounted in the stack 22 as shown. The roof 4 is preferably provided with a tapered baffle 24 adjacent the top of the stack 22 for the purpose of diverting the stream of gas as indicated by the arrows. The lower portion of the stack 22 extends horizontally beneath the floor 5 to form an extension or passage 25 in which are mounted the cooling coils 14 and associated drip pan 15 and drain pipe 16 leading outside the room, as well as the steam jet 17 and radiator 18.

The operation of the coloring room shown in Fig. 2 is similar to that described above in connection with Fig. 1, the fan 23 causing a continuous recirculation of the heated air and gases which pass upwardly through stack 22, then throughout all parts of the room and in contact with the surfaces of the entire charge of fruit, and thence downwardly through the slotted floor 5 to the lower end of stack 22, as indicated by the arrows in Fig. 2. The temperature and relative humidity of the room are maintained at the desired point in the manner previously described.

Figure 3:
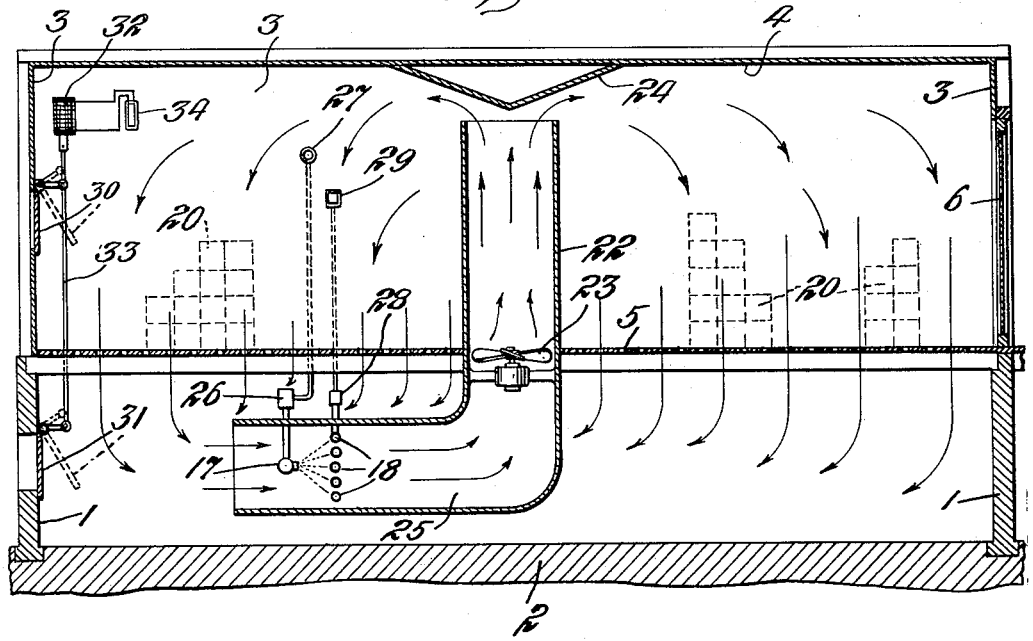
Fig. 3 is a view similar to Fig. 2, but illustrating a further modification of the invention.

The modified coloring room shown in Fig. 3 is similar to that shown in Fig. 2 except that I omit the cooling coil 14, the drip pan 15 and drain pipe 16, and, instead, I provide means for automatically controlling the supply of live steam through pipe 17 anud the supply of dry heat to radiator 18, and, in addition, provide means for admitting fresh air to the room in amounts just sufficient to prevent the temperature therein from exceeding a predetermined maximum. As previously stated, the cost of equipping a coloring room with a cooling coil to condense the moisture out of the air is appreciable, and in some cases the modified method and apparatus of Fig. 3 are desirable to reduce this cost while at the same time preserving part of the benefits accruing from the methods of Figs. 1 and 2.

In Fig. 3 the steam pipe or jet 17 is controlled by a suitable valve 26 operated by a wet bulb 27 of the usual type which is kept continuously moist so that the operation of the valve 26 will be based upon the wet bulb temperature of the room. The supply of steam to the radiator 18, furthermore, is controlled by a suitable valve 28 operated and controlled by a humidostat 29 which maintains the desired humidity of 80%. These two supplies of heat raise the temperature of the room to the minimum operating temperature of 85 degrees dry bulb and 80 degrees wet bulb. From that point on, only live steam is admitted to the room, which is substantially air tight. When the room reaches the point of maximum temperature for safe operation, say 85 degrees wet bulb and 90 degrees dry bulb, instead of removing the moisture by use of a cooling coil or other means for condensing the moisture out of the air, I admit fresh air to the room and discharge a corresponding amount of moist air therefrom, by means of two doors or dampers 30 and 31, the former being located above the false floor 5 and the other being located beneath said floor.

The dampers 30 and 31 are controlled by a suitable damper motor, solenoid or the like 32 through a connecting lever 33, the said motor 32 being operated by a thermostat or dry bulb temperature control 34 suitably mounted within the room as shown in Fig. 3. The thermostat 34, in conjunction with motor 32, opens the dampers 30 and 31 whenever the temperature in the room exceeds a predetermined maximum such as 90° F. Since damper 30 is located above the floor 5 while damper 31 is located below said floor, it will be evident that, regardless of whether the pressure in the room is generated above or below the floor, it will cause the moist air to leave the room through one damper opening and the fresh air to be sucked into the room through the other damper opening. In this embodiment of the invention the thermostat 34, when actuated to admit fresh air to the room, may also operate to admit additional ethylene gas to the room through the main pipe supply or an auxiliary pipe, as desired.

My method of coloring fruits and vegetables described above effects a substantial reduction in the amount of spoilage due to decay or wilt, reduces the coloring time about one-third or from about 72 hours to about 48 hours, and develops a fresher and brighter color in the fruits and vegetables than any other method with which I am familiar. It is a peculiar fact that oranges when colored in the ordinary manner previously employed are a pale yellow, whereas when the same fruits are colored by my method they develop a more reddish color which is quite different from the familiar lemon hue so commonly seen in the past, and much more desirable.

The invention claimed is:

1. Method of coloring fruits and vegetables which comprises placing same in a substantially air-tight room, admitting live steam to said room for a period of time sufficient to raise the contents of the room at least to the wet bulb equivalent of the temperature at which the room is to operate, then discontinuing the admission of said steam and raising the dry bulb temperature of the room to the point at which the room is to operate while continuously recirculating the heated gases through the room, and continuously removing moisture from said room in amounts sufficient to prevent the temperature of the room from exceeding a predetermined maximum temperature.

2. Method of coloring fruits and vegetables which comprises placing same in a substantially air-tight room, admitting live steam to said room and simultaneously applying dry heat to said room to maintain a relative humidity below 85%, while raising said fruit to the minimum operating temperature at which the fruit will begin to color, then cutting off the live steam and maintaining the relative humidity by the admission of said dry heat only until the temperature of the room reaches a maximum for safe operation not exceeding 100° F., and then preventing a further rise in temperature by removing moisture from said room.

3. Method of coloring fruits and vegetables which comprises placing same in a substantially air-tight room, admitting live steam to said room for a period of time sufficient to raise the contents of the room at least to the wet bulb equivalent of the temperature at which the room is to operate, then discontinuing the admission of said steam and raising the dry bulb temperature of the room to the point at which the room is to operate while continuously recirculating the heated gases through the room, and continuously condensing and removing moisture from said room in amounts sufficient to prevent a further rise in temperature therein.

4. The combination with a coloring room for fruits and vegetables, of means for maintaining said room substantially air-tight, a circulating system including means for continuously circulating gases through said room, means in said system for heating said gases, and means in said system for continuously removing moisture from said gases to prevent the temperature of said room from rising above a predetermined maximum.

5. A coloring room for fruits and veegtables having a false floor containing a multiplicity of openings permitting the circulation of gases therethrough, means for circulating gases through said room and said floor, means for controlling the temperature in said room, means for maintaining the relative humidity of said room below 85% throughout the coloring operation, and means for continuously removing moisture from said room in amounts sufficient to prevent the temperature therein from rising above a predetermined maximum.

6. A coloring room for fruits and vegetables having a false floor containing a multiplicity of openings permitting the circulation of gases therethrough, a circulating system for gases including a conduit extending upwardly from beneath said floor and opening into the top of said room, means for circulating gases through said room and said conduit, means for controlling the temperature and humidity of said gases, and means in said conduit for condensing and removing moisture from said circulating gases to prevent the temperature of said room from rising above a predetermined maximum.

7. A coloring room for fruits and vegetables having a false floor containing a multiplicity of openings permitting the circulation of gases therethrough, a stack extending through said floor and projecting upwardly toward the top of said room, means for continuously circulating gases through said stack and said room, means for controlling the temperature and humidity of said gases, a cooling device in said stack for condensing excess moisture contained in said gases, and means associated with said cooling device for continuously removing condensed moisture from said room to prevent the temperature of said room from rising above a predetermined maximum.

8. Method of coloring fruits and vegetables in a substantially air-tight coloring room which comprises circulating heated gases through said room while maintaining the relative humidity of said room below 85% throughout the coloring operation, and admitting air to said room in amounts only sufficient to prevent the temperature therein from exceeding a predetermined maximum temperature.

9. Method of coloring fruits and vegetables which comprises placing same in a substantially air-tight room, admitting live steam to said room for a period of time sufficient to raise the contents of the room at least to the wet bulb equivalent of the temperature at which the room is to operate, then discontinuing the admission of said steam and raising the dry bulb temperature of the room to the point at which the room is to operate while continuously recirculating the heated gases through the room, and removing moisture from the room by blowing into said room air containing less moisture per pound than the air in the room and in quantities just sufficient to prevent the temperature of the room from exceeding a predetermined maximum temperature.

10. Method of coloring fruits and vegetables which comprises placing same in a substantially air-tight room, admitting live steam to said room and simultaneously applying dry heat to said room to maintain a relative humidity below 85%, while raising said fruit to the minimum operating temperature at which the fruit will begin to color, then cutting off the live steam and maintaining the relative humidity by the admission of said dry heat only until the temperature of the room reaches a maximum for safe operation not exceeding 100° F., and then removing moisture from said room to prevent a further rise in temperature by admitting sufficient air containing less moisture per pound than the air in the room and simultaneously removing from the room an equal quantity of air containing more moisture than the air admitted thereto.

11. The combination with a coloring room for fruits and vegetables, of means for maintaining said room substantially air-tight, a circulating system including means for continuously circulating gases through said room, means in said system for heating said gases, and means in said system for continuously admitting partially dry air to said room and for removing moist air therefrom in amounts just sufficient to prevent the rise in temperature of the room above a predetermined maximum.

12. A coloring room for fruits and vegetables having a false floor containing a multiplicity of openings permitting the circulation of gases therethrough, a circulating system for gases including a conduit extending upwardly from beneath said floor and opening into the top of said room, means for circulating gases through said room and said conduit, means for controlling the temperature and humidity of said gases, and means for admitting a sufficient amount of partially dry air to said room and for simultaneously removing an equal amount of moist air to prevent the temperature of the room from exceeding a predetermined maximum.

13. A coloring room for fruits and vegetables having a false floor containing a multiplicity of openings permitting the circulation of gases therethrough, a stack extending through said floor and projecting upwardly toward the top of said room, means for continuously circulating gases through said stack and said room, means for controlling the temperature and humidity of said gases, and means for admitting to said room the necessary amount of partially dry air and simultaneously removing therefrom a like amount of moist air, to prevent the temperature of said room from exceeding a predetermined maximum.

BRONSON C. SKINNER.